(12) United States Patent
Takeuchi

(10) Patent No.: US 12,170,440 B2
(45) Date of Patent: Dec. 17, 2024

(54) SURGE PROTECTION IN SEMICONDUCTOR INTEGRATED CIRCUIT AND SEMICONDUCTOR MEMORY DEVICE

(71) Applicant: KIOXIA CORPORATION, Tokyo (JP)

(72) Inventor: Tomohiko Takeuchi, Funabashi Chiba (JP)

(73) Assignee: Kioxia Corporation, Tokyo (JP)

( * ) Notice: Subject to any disclaimer, the term of this patent is extended or adjusted under 35 U.S.C. 154(b) by 187 days.

(21) Appl. No.: 17/897,081

(22) Filed: Aug. 26, 2022

(65) Prior Publication Data

US 2023/0198251 A1    Jun. 22, 2023

(30) Foreign Application Priority Data

Dec. 17, 2021 (JP) .................................. 2021-204996

(51) Int. Cl.
    *H02H 9/04* (2006.01)
(52) U.S. Cl.
    CPC .................................. *H02H 9/046* (2013.01)
(58) Field of Classification Search
    CPC ..................................................... H02H 9/046
    USPC ........................................................... 361/56
    See application file for complete search history.

(56) References Cited

U.S. PATENT DOCUMENTS

| | | | |
|---|---|---|---|
| 6,433,985 B1* | 8/2002 | Voldman | H01L 27/0251 361/111 |
| 8,181,140 B2 | 5/2012 | Kireev et al. | |
| 8,482,889 B2* | 7/2013 | Huang | H02H 9/046 361/111 |
| 9,019,669 B1* | 4/2015 | Ransijn | H02H 9/046 361/56 |
| 9,602,314 B1* | 3/2017 | Chang | H04L 25/0292 |
| 9,621,136 B1* | 4/2017 | Chang | H03L 7/091 |
| 9,929,698 B2 | 3/2018 | Gudem et al. | |
| 10,530,325 B1* | 1/2020 | Gonzales | H04L 25/0292 |
| 10,944,397 B1* | 3/2021 | Yuan | H03K 17/6872 |
| 11,355,924 B2* | 6/2022 | Domanski | H02H 9/02 |
| 11,418,026 B1* | 8/2022 | Morf | H02H 9/046 |
| 2005/0162790 A1* | 7/2005 | Yoshinaga | H01L 27/0251 361/56 |

(Continued)

FOREIGN PATENT DOCUMENTS

CN    101707362 A  *  5/2010
CN    108322195 A  *  7/2018

(Continued)

*Primary Examiner* — Dharti H Patel
(74) *Attorney, Agent, or Firm* — Kim & Stewart LLP

(57) ABSTRACT

A semiconductor integrated circuit includes an input terminal, a semiconductor circuit, and a surge protection circuit connected between the input terminal and the semiconductor circuit. The surge protection circuit includes a first clamping circuit, a second clamping circuit, and a first inductor. The first clamping circuit includes first and second diodes connected in series. The second clamping circuit includes third and fourth diodes connected in series. The first inductor is connected between a first node and a second node. The first node is between the first diode and the second diode and connected to the input terminal. The second node is between the third diode and the fourth diode and connected to the semiconductor circuit.

20 Claims, 2 Drawing Sheets

(56) References Cited

U.S. PATENT DOCUMENTS

| | | | | |
|---|---|---|---|---|
| 2006/0256489 A1* | 11/2006 | Ker | ............. | H03F 3/195 |
| | | | | 361/56 |
| 2011/0051300 A1* | 3/2011 | Thijs | ............. | H03F 3/607 |
| | | | | 361/56 |
| 2012/0019968 A1* | 1/2012 | Hsieh | ............. | H01L 27/0288 |
| | | | | 361/56 |
| 2012/0212865 A1* | 8/2012 | Tsai | ............. | H01L 27/0288 |
| | | | | 361/56 |
| 2012/0275074 A1* | 11/2012 | Dill | ............. | H01F 27/2804 |
| | | | | 336/192 |
| 2012/0314328 A1* | 12/2012 | Dill | ............. | H01F 27/2804 |
| | | | | 361/56 |
| 2014/0307355 A1* | 10/2014 | Tsai | ............. | H03F 1/52 |
| | | | | 361/56 |
| 2016/0036218 A1* | 2/2016 | Tsai | ............. | H01L 27/0288 |
| | | | | 361/56 |
| 2019/0089150 A1* | 3/2019 | Gharibdoust | ............. | H01F 29/02 |
| 2019/0245345 A1* | 8/2019 | Francese | ............. | H02H 9/046 |
| 2020/0021254 A1* | 1/2020 | Shin | ............. | H03F 3/21 |

FOREIGN PATENT DOCUMENTS

| | | | |
|---|---|---|---|
| JP | 5501471 | B2 | 5/2014 |
| JP | 6312792 | B2 | 4/2018 |
| WO | 2011/056270 | A1 | 5/2011 |
| WO | 2015/132958 | A1 | 9/2015 |

* cited by examiner

SURGE PROTECTION IN SEMICONDUCTOR INTEGRATED CIRCUIT AND SEMICONDUCTOR MEMORY DEVICE

CROSS-REFERENCE TO RELATED APPLICATION(S)

This application is based upon and claims the benefit of priority from Japanese Patent Application No. 2021-204996, filed Dec. 17, 2021, the entire contents of which are incorporated herein by reference.

FIELD

Embodiments described herein relate generally to a semiconductor integrated circuit and a semiconductor memory device.

BACKGROUND

A semiconductor integrated circuit has an electrostatic discharge (ESD) protection circuit in order to protect an internal circuit from a surge voltage caused by electrostatic discharge. A typical ESD protection circuit includes a clamping circuit including a pair of diodes, one of which is provided between an input signal line and a power supply line and the other of which is provided between the input signal line and a negative power supply line (or a ground), and a current limiting resistor. The pair of diode is connected to each other in series. The current limiting resistor is connected in series to the input signal line. When the surge voltage is input into the input signal line, the surge voltage is clamped by the power supply line or the negative power supply line via the diodes, whereby the internal circuit is protected.

Meanwhile, an ESD protection circuit (or protection network) having two clamping circuits is specified as ESD protection topology prescribed by ESD guidelines or the like for a semiconductor integrated circuit. An ESD protection network having two clamping circuits can provide high ESD resistance compared with an ESD protection circuit having only one clamping circuit. However, the current limiting resistor disposed between the two clamping circuits and a load capacitance of the internal circuit function as a low-pass filter (LPF), which may negatively affect an available frequency band of transmission in the semiconductor integrated circuit.

DETAILED DESCRIPTION

Embodiments provide a semiconductor integrated circuit, a receiving device, and a semiconductor memory device with an improved frequency band.

In general, according to an embodiment, a semiconductor integrated circuit includes an input terminal, a semiconductor circuit, and a surge protection circuit connected between the input terminal and the semiconductor circuit. The surge protection circuit includes a first clamping circuit, a second clamping circuit, and a first inductor. The first clamping circuit includes first and second diodes connected in series. A cathode of the first diode is connected to a positive power supply line, an anode of the first diode is connected to a cathode of the second diode, and an anode of the second diode is connected to a negative power supply line. The second clamping circuit includes third and fourth diodes connected in series. A cathode of the third diode is connected to the positive power supply line, an anode of the third diode is connected to a cathode of the fourth diode, and an anode of the fourth diode is connected to the negative power supply line. The first inductor is connected between a first node and a second node. The first node is between the anode of the first diode and the cathode of the second diode and connected to the input terminal. The second node is between the anode of the third diode and the cathode of the fourth diode and connected to the semiconductor circuit.

A CR circuit formed of a current limiting resistor of an ESD protection circuit and a load capacitance of an internal circuit of a receiving device functions as an LPF, which may negatively affect transmission frequency properties of the receiving device. That is, there is a demand for improving transmission frequency properties while satisfying standards required of an ESD protection circuit.

An ESD protection circuit that does not function as a CR circuit is applied to a receiving device according to embodiments of the present disclosure. Instead, an inductance component is provided in the ESD protection circuit. The inductance component functions as a current limiting resistor, and ESD resistance of the ESD protection circuit having a multiple-stage clamping circuit is ensured thereby.

First Embodiment

Figure 1:
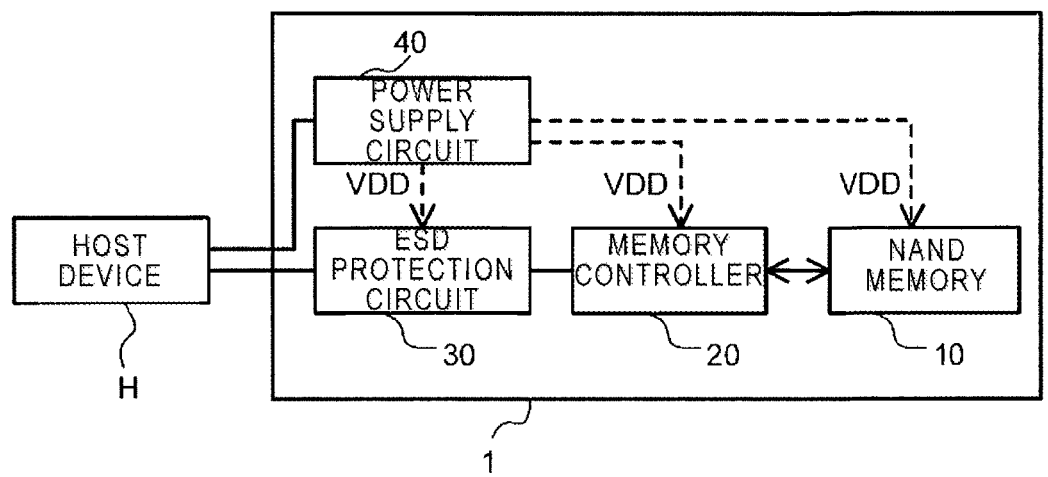
FIG. 1 is a block diagram showing a configuration of a system including a receiving device according to a first embodiment.
Figure 2:
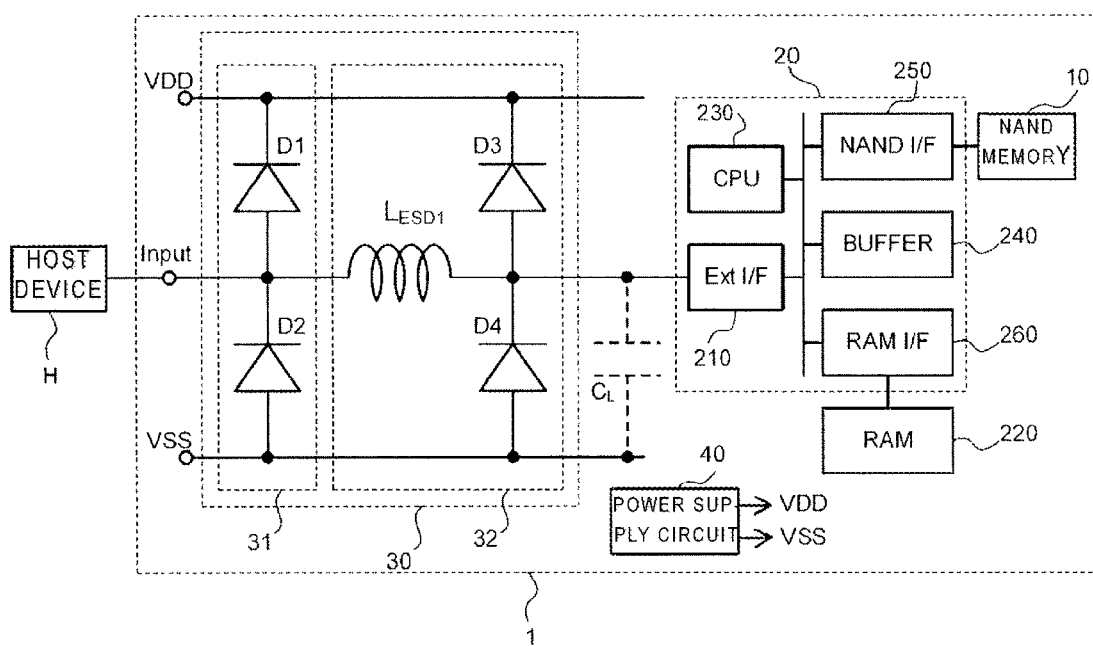
FIG. 2 is a block diagram showing a configuration of the receiving device according to the first embodiment.

Referring to FIGS. 1 and 2, a configuration of a receiving device 1 according to a first embodiment will be described. The receiving device 1 has a configuration that can be connected to, for example, a host device H, and receives a signal from the host device H. In an example shown in FIG. 1, the receiving device 1 is a memory device. The host device H is, for example, a server, a personal computer, or a mobile information processing device. The receiving device 1 functions as an external storage device of the host device H. The host device H can transmit a signal corresponding to a request (may be referred to as command) to the receiving device 1, and the receiving device 1 receives the signal from the host device H. Requests from the host device H include a read request and a write request.

The receiving device 1 includes a NAND flash memory (, which is a NAND memory) 10, a controller (, which is an example of a memory controller) 20, an ESD protection circuit 30, and a power supply circuit 40. The NAND flash memory 10 includes one or more memory chips. The memory chip includes a plurality of memory cell transistors, and can store data non-volatilely. The memory chip is connected to the controller 20 via a NAND bus. The power supply circuit 40 generates power used by the receiving device 1 based on power supplied from the host device H. The power supply circuit 40 supplies the generated power to the NAND flash memory 10, the controller 20, and the ESD protection circuit 30 via a positive power supply line VDD.

The controller 20 carries out a program process, a read process, an erase process, and the like, with respect to the NAND flash memory 10. The controller 20 is a semiconductor circuit configured as, for example, a system on a chip (SoC). The controller 20 may also be configured as a field-programmable gate array (FPGA) or an application-specific integrated circuit (ASIC). The controller 20 may include a plurality of chips. As shown in FIG. 2, the controller 20 includes an external interface (Ext I/F) 210, a CPU 230, a buffer memory (BUFFER in FIG. 3) 240, a NAND interface (NAND I/F) 250, and a RAM interface (RAM I/F) 260. Each function of the controller 20 may be achieved by the CPU 230, which executes software (or firmware), dedicated hardware, or a combination thereof. The CPU 230 controls operations of the controller 20.

The external interface (Ext I/F) 210 is connected to another external device (for example, the host device H) via a bus compliant with an interface standard such as a serial advanced technology attachment (SATA) standard, a serial attached SCSI (SAS™) standard, a peripheral components interconnect (PCI) express (PCIe™) standard, or a system management bus (SMBus™) standard, and performs communication between the controller 20 and the external device.

The NAND interface (NAND I/F) 250 is connected to the NAND flash memory 10, and executes communication between the controller 20 and the NAND flash memory 10. The RAM interface (RAM I/F) 260 is connected to a random access memory (RAM) 220, and executes communication between the controller 20 and the RAM 220.

The RAM 220 serves as a working area to which the CPU 230 accesses via the RAM interface 260. The buffer memory 240 temporarily stores data to be transmitted to the NAND flash memory 10 and data received from the NAND flash memory 10. The RAM 220 and the buffer memory 240 may be implemented by, for example, a dynamic random access memory (DRAM), a static random access memory (SRAM), or a combination thereof. Types of memory employed for the RAM 220 and the buffer memory 240 are not limited to these. The buffer memory 240 may be implemented on an exterior of the controller 20.

As shown in FIG. 1, the ESD protection circuit 30 is disposed between the controller 20 and the host device H when the receiving device 1 is connected to the host device H. The ESD protection circuit 30 protects an internal circuit of the controller 20 and the like by clamping a surge voltage entering from an exterior of the receiving device 1. As shown in FIG. 2, the ESD protection circuit 30 includes a first clamping circuit 31 and a second clamping circuit 32. That is, the ESD protection circuit 30 has a total of two stages of clamping circuits. The ESD protection circuit 30 may be provided as a circuit of one portion of the external interface (Ext I/F) 210. The ESD protection circuit 30 and the external interface (Ext I/F) 210 are one example of a semiconductor integrated circuit.

The first clamping circuit 31 clamps a surge voltage entering from an input terminal Input. The first clamping circuit 31 has a pair of diodes D1 and D2 connected in series. A cathode of the diode D1 is connected to the positive power supply line VDD, and an anode of the diode D1 is connected to a cathode of the diode D2. An anode of the diode D2 is connected to a negative power supply line VSS. The negative power supply line VSS may be a ground voltage line (GND). The input terminal Input is connected to a connection point of the anode of the diode D1 and the cathode of the diode D2. The surge voltage entering the input terminal Input is clamped by the positive power supply line VDD or the negative power supply line VSS via the diode D1 or D2.

The second clamping circuit 32 further clamps a voltage clamped by the first clamping circuit 31. The second clamping circuit 32 has a pair of diodes D3 and D4 connected in series. A cathode of the diode D3 is connected to the positive power supply line VDD, and an anode of the diode D3 is connected to a cathode of the diode D4. An anode of the diode D4 is connected to the negative power supply line VSS. The negative power supply line VSS may be a ground voltage line (GND). A connection point of the anode of the diode D3 and the cathode of the diode D4 is connected via an inductor $L_{ESD1}$ to the connection point of the anode of the diode D1 and the cathode of the diode D2. A surge voltage entering from the first clamping circuit 31 via the inductor $L_{ESD1}$ is clamped by the positive power supply line VDD or the negative power supply line VSS via the diode D3 or D4.

The inductor $L_{ESD1}$ has a function as a current limiting resistor $R_{ESD}$ in an ESD protection circuit wherein two stages of clamping circuits are disposed. That is, considering a relationship of the load capacitance $C_L$ of the controller 20 and the inductor $L_{ESD1}$, which configure an LC circuit, the inductor $L_{ESD1}$ is configured such that impedance is higher at a frequency band that is a target of ESD protection. That is, by configuring the inductor $L_{ESD1}$ such that impedance is higher at a frequency band of the surge voltage, the ESD protection circuit acts as a two-stage clamping circuit even when no current limiting resistor $R_{ESD}$ is used. As one example, a target frequency band of the ESD protection is known as a frequency band of several gigahertz in a charged device model (CDM). The inductor $L_{ESD1}$ has an inductance such that an impedance at a peak frequency of the surge voltage is sufficiently high to serve as a second clamp.

An output of the second clamping circuit 32, that is, the connection point of the anode of the diode D3 and the cathode of the diode D4, is connected to the external interface 210 of the controller 20. That is, a signal sent from the host device H is input into the external interface 210 of the controller 20 via the ESD protection circuit 30. Meanwhile, a surge voltage entering the input terminal Input is clamped to the positive power supply line VDD or the negative power supply line VSS by the first clamping circuit 31 and/or the second clamping circuit 32. As a result, the ESD protection circuit 30 can prevent the surge voltage from entering the controller 20.

The power supply circuit 40 supplies power to the NAND flash memory 10, the controller 20, and the ESD protection circuit 30 via the positive power supply line VDD and the negative power supply line VSS. The negative power supply line VSS may be a ground GND, or may be at a different reference voltage.

A clamping circuit used in a comparative example is configured such that a current limiting resistor is disposed between two clamping circuits. In contrast, the receiving device 1 according to the first embodiment includes the inductor $L_{ESD1}$, wherein impedance at a frequency or in a frequency band of a surge voltage is higher than in another frequency band, in place of the current limiting resistor between two clamping circuits of an ESD protection circuit having a two-stage configuration. According to such a configuration, desired ESD protection properties can be obtained, without negatively affecting transmission frequency band.

Second Embodiment

Figure 3:
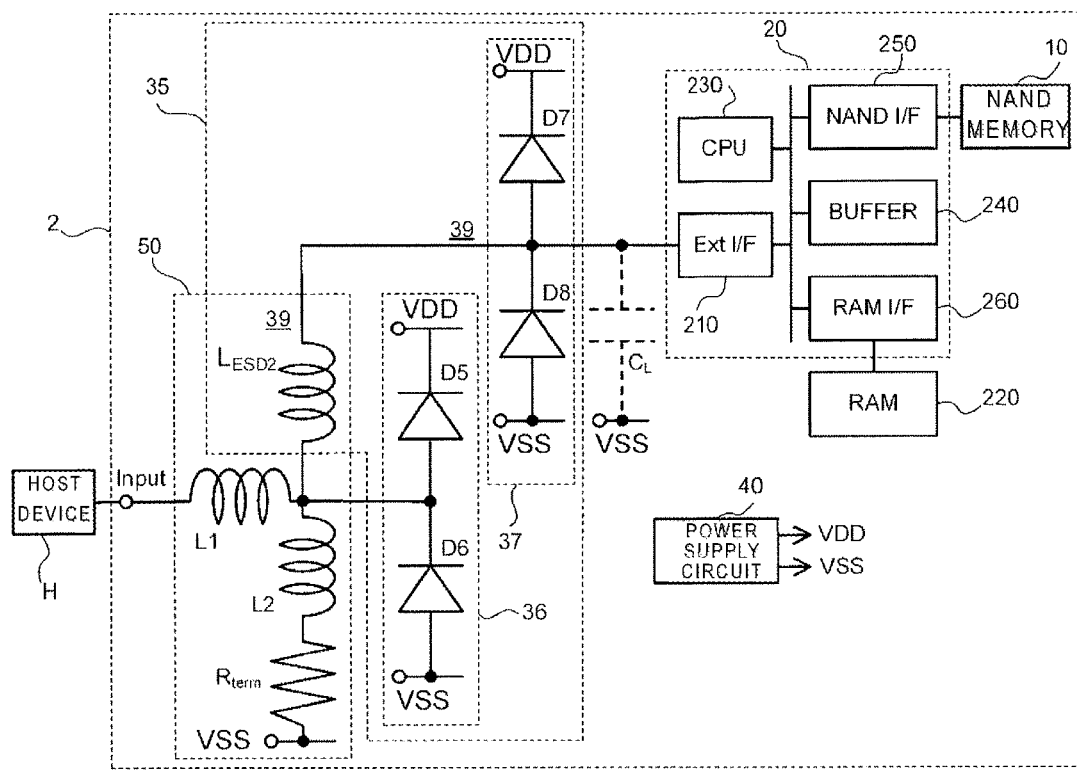
FIG. 3 is a block diagram showing a configuration of a receiving device according to a second embodiment.

A configuration of a receiving device 2 according to a second embodiment will be described with reference to FIG. 3. Unlike the receiving device 1 according to the first embodiment, the receiving device 2 includes a matching circuit (e.g., T-Coil). In the following description, elements that are the same as those in the first embodiment will be shown with the same reference signs, and a redundant description will be omitted. As shown in FIG. 3, the receiving device 2 according to the second embodiment includes the NAND flash memory 10, the controller 20, an ESD protection circuit 35, the power supply circuit 40, and a matching circuit 50. The ESD protection circuit 35 and the matching circuit 50 may be provided as a circuit of one portion of the external interface (Ext I/F) 210. The ESD protection circuit 35, the matching circuit 50, and the external interface (Ext I/F) 210 are one example of a semiconductor integrated circuit.

The ESD protection circuit 35 includes a first clamping circuit 36 and a second clamping circuit 37. The ESD protection circuit 35 has a total of two stages of clamping circuits.

The first clamping circuit 36 clamps a surge voltage entering from the input terminal Input via the matching circuit 50. The first clamping circuit 36 has a pair of diodes D5 and D6 connected in series. A cathode of the diode D5 is connected to the positive power supply line VDD, and an anode of the diode D5 is connected to a cathode of the diode D6. An anode of the diode D6 is connected to the negative power supply line VSS. The negative power supply line VSS may be a ground voltage line (GND). The input terminal Input is connected via the matching circuit 50 to a connection point of the anode of the diode D5 and the cathode of the diode D6. A surge voltage entering from the input terminal Input is clamped by the positive power supply line VDD or the negative power supply line VSS via the diode D5 or D6.

The second clamping circuit 37 further clamps a voltage clamped by the first clamping circuit 36. The second clamping circuit 37 has a pair of diodes D7 and D8 connected in series. A cathode of the diode D7 is connected to the positive power supply line VDD, and an anode of the diode D7 is connected to a cathode of the diode D8. An anode of the diode D8 is connected to the negative power supply line VSS. The negative power supply line VSS may be a ground voltage line (GND). A connection point of the anode of the diode D7 and the cathode of the diode D8 is connected via an inductor $L_{ESD2}$ to the connection point of the anode of the diode D5 and the cathode of the diode D6. A surge voltage entering via the inductor $L_{ESD2}$ is clamped by the positive power supply line VDD or the negative power supply line VSS via the diode D7 or D8.

The inductor $L_{ESD2}$ functions as a current limiting resistor $R_{ESD}$ in the ESD protection circuit 35, wherein two stages of clamping circuits are disposed. That is, considering a relationship of the load capacitance $C_L$ and the inductor $L_{ESD2}$, which configure an LC circuit, the inductor $L_{ESD2}$ is configured such that impedance is higher at a target frequency of ESD protection. That is, by configuring the inductor $L_{ESD2}$ such that impedance is higher at the target frequency or frequency band of the surge voltage, the ESD protection circuit 35 acts as a two-stage clamping circuit even though no current limiting resistor is used. The inductor $L_{ESD2}$ also functions as an inductor of a T-Coil forming the matching circuit 50, to be described hereafter.

An output of the second clamping circuit 37, that is, the connection point of the anode of the diode D7 and the cathode of the diode D8, is connected to the external interface 210. That is, a signal sent from the host device H is input into the external interface 210 of the controller 20 via the matching circuit 50 and the ESD protection circuit 35. Meanwhile, the surge voltage entering the input terminal Input is clamped to the positive power supply line VDD or the negative power supply line VSS by the first clamping circuit 36 and/or the second clamping circuit 37. As a result, the ESD protection circuit 35 can prevent the surge voltage from entering the controller 20.

The matching circuit 50 is an interface circuit that carries out impedance matching of the input terminal Input and the controller 20. As shown in FIG. 3, the matching circuit 50 forms a T-Coil wherein three inductors are disposed in a T-shape.

As shown in FIG. 3, the matching circuit 50 has an inductor L1, an inductor L2, and the inductor $L_{ESD2}$. The inductor $L_{ESD2}$ functions both as an inductor of the ESD protection circuit 35 and as an inductor of the matching circuit 50. One end (first end) of the inductor L1, one end (first end) of the inductor L2, and one end (first end) of the inductor $L_{ESD2}$ are connected to each other. The first end of the inductor L1, the first end of the inductor L2, and the first end of the inductor $L_{ESD2}$ are connected to the connection point of the anode of the diode D5 and the cathode of the diode D6.

Another end (second end) of the inductor L1 is connected to the input terminal Input. Another end (second end) of the inductor L2 is connected to one end (first end) of a terminating resistor $R_{term}$. Another end (second end) of the terminating resistor $R_{term}$ is connected to the negative power supply line VSS (or the ground voltage line GND). Another end (second end) of the inductor $L_{ESD2}$ is connected to the connection point of the anode of the diode D7 and the cathode of the diode D8 via a connection line 39.

The inductor $L_{ESD2}$ functions as the inductor of the matching circuit 50, and also functions as a current limiting resistor that connects the first clamping circuit 36 and the second clamping circuit 37 of the ESD protection circuit 35. The inductor $L_{ESD2}$ may be integrally formed with the connection line 39. That is, the inductor $L_{ESD2}$ may also be implemented using a discrete component. The inductor $L_{ESD2}$ may be configured by adjusting a length or a wiring form of the connection line 39. Forming the inductor $L_{ESD2}$ as the connection line 39 contributes to reduction of space on a substrate.

In this way, the receiving device 2 according to the second embodiment includes the inductor $L_{ESD2}$, wherein impedance at a frequency or in a frequency band of a surge voltage is higher than in another frequency band, in place of the current limiting resistor $R_{ESD}$ between two clamping circuits of an ESD protection circuit having a two-stage configuration. According to such a configuration, desired ESD protection properties can be obtained, without negatively affecting transmission frequency band properties. Also, according to the receiving device 2 of the second embodiment, the number of components can be reduced, and space on a substrate can be saved, because the inductor $L_{ESD2}$ functions as the current limiting resistor RESE and also as an inductor of a matching circuit.

While certain embodiments have been described, these embodiments have been presented by way of example only, and are not intended to limit the scope of the disclosure. Indeed, the novel embodiments described herein may be embodied in a variety of other forms; furthermore, various omissions, substitutions, and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A semiconductor integrated circuit comprising:
an input terminal;
a semiconductor circuit; and a surge protection circuit connected between the input terminal and the semiconductor circuit, wherein the surge protection circuit includes:
a first clamping circuit including first and second diodes connected in series, a cathode of the first diode being connected to a positive power supply line, an anode of the first diode being connected to a cathode of the second diode, and an anode of the second diode being connected to a negative power supply line;
a second clamping circuit including third and fourth diodes connected in series, a cathode of the third diode being connected to the positive power supply line, an anode of the third diode being connected to a cathode of the fourth diode, and an anode of the fourth diode being connected to the negative power supply line; and
a first inductor connected between a first node and a second node, the first node being between the anode of the first diode and the cathode of the second diode with no resistor element between the first node and the anode of the first diode and between the first node and the cathode of the second diode, and connected to the input terminal, the second node being between the anode of the third diode and the cathode of the fourth diode and connected to the semiconductor circuit, no resistor element being provided between the first node and the second node.

2. The semiconductor integrated circuit according to claim 1, wherein the first inductor has an inductance value that reduces a surge voltage entering through the input terminal and configured to output a signal in which the surge voltage has been reduced to the semiconductor circuit.

3. The semiconductor integrated circuit according to claim 1, wherein the first inductor has an inductance value that causes an impedance at a frequency of a surge voltage entering through the input terminal to be greater than an impedance at a frequency of a signal input through the input terminal.

4. The semiconductor integrated circuit according to claim 1, wherein no resistor element is provided between the first node and the second node and the anode of the third diode and between the second node and the cathode of the fourth diode.

5. The semiconductor integrated circuit according to claim 1, further comprising:
an impedance matching circuit between the input terminal and the surge protection circuit.

6. The semiconductor integrated circuit according to claim 5, wherein the impedance matching circuit includes a second inductor connected between the input terminal and the first node and a third inductor connected between the first node and the negative power supply line.

7. The semiconductor integrated circuit according to claim 6, wherein no resistor element is provided between the first node and the second node.

8. A device comprising:
the semiconductor integrated circuit according to claim 1; and
a power supply circuit configured to supply power to the positive power supply line.

9. A semiconductor memory device comprising:
a memory chip including a plurality of memory cell transistors;
a controller chip including a control circuit configured to control the memory cell transistors;
an input terminal; and a surge protection circuit connected between the input terminal and the controller chip, wherein the surge protection circuit includes:
a first clamping circuit including first and second diodes connected in series, a cathode of the first diode being connected to a positive power supply line, an anode of the first diode being connected to a cathode of the second diode, and an anode of the second diode being connected to a negative power supply line;
a second clamping circuit including third and fourth diodes connected in series, a cathode of the third diode being connected to the positive power supply line, an anode of the third diode being connected to a cathode of the fourth diode, and an anode of the fourth diode being connected to the negative power supply line; and
a first inductor connected between a first node and a second node, the first node being between the anode of the first diode and the cathode of the second diode and connected to the input terminal, the second node being between the anode of the third diode and the cathode of the fourth diode and connected to the controller chip, no resistor element being provided between the first node and the second node.

10. The semiconductor memory device according to claim 9, wherein the first inductor has an inductance value that reduce a surge voltage entering through the input terminal and configured to output a signal in which the surge voltage has been reduced to the controller chip.

11. The semiconductor memory device according to claim 9, wherein the first inductor has an inductance value that causes an impedance at a frequency of a surge voltage entering through the input terminal to be greater than an impedance at a frequency of a signal input through the input terminal.

12. The semiconductor memory device according to claim 9, wherein no resistor element is provided between the first node and the anode of the first diode and between the first node and the cathode of the second diode.

13. The semiconductor memory device according to claim 9, further comprising:
an impedance matching circuit between the input terminal and the surge protection circuit.

14. The semiconductor memory device according to claim 13, wherein the impedance matching circuit includes a second inductor connected between the input terminal and the first node and a third inductor connected between the first node and the negative power supply line.

15. The semiconductor memory device according to claim 14, wherein no resistor element is provided between the first node and the second node.

16. The semiconductor memory device according to claim 9, wherein the input terminal is connectable to a host device and receives a signal representing a command from the host device.

17. The semiconductor memory device according to claim 9, wherein the control circuit includes a first interface circuit connected to the memory chip and a second interface circuit connected to the input terminal via the surge protection circuit.

18. The semiconductor memory device according to claim 9, further comprising:
a power supply circuit configured to supply power to the positive power supply line.

19. The semiconductor memory device according to claim 18, further comprising:

a power terminal connectable to a host device, wherein the power supply circuit receives power from the host device via the power terminal.

20. The semiconductor memory device according to claim 18, wherein the input terminal is connectable to the host device and receives a signal representing a command from the host device.

\* \* \* \* \*

UNITED STATES PATENT AND TRADEMARK OFFICE
CERTIFICATE OF CORRECTION

| | | |
|---|---|---|
| PATENT NO. | : 12,170,440 B2 | Page 1 of 1 |
| APPLICATION NO. | : 17/897081 | |
| DATED | : December 17, 2024 | |
| INVENTOR(S) | : Tomohiko Takeuchi | |

It is certified that error appears in the above-identified patent and that said Letters Patent is hereby corrected as shown below:

In the Claims

Column 7, Line 41, delete "the first node and".

Signed and Sealed this
Fifteenth Day of July, 2025

Coke Morgan Stewart
*Acting Director of the United States Patent and Trademark Office*